United States Patent [19]
Husbands

[11] Patent Number: 5,317,198
[45] Date of Patent: May 31, 1994

[54] OPTICALLY CONTROLLED REMOTE BY-PASS SWITCH

[75] Inventor: Charles R. Husbands, Acton, Mass.

[73] Assignee: The MITRE Corporation, Bedford, Mass.

[21] Appl. No.: 954,432

[22] Filed: Sep. 30, 1992

Related U.S. Application Data

[63] Continuation of Ser. No. 543,465, Jun. 26, 1990, abandoned.

[51] Int. Cl.⁵ .................... H04B 10/08; H04J 14/00; G02F 1/00
[52] U.S. Cl. .................... 307/116; 250/227.11; 340/825.06; 370/16.1; 371/11.2; 379/102; 359/118
[58] Field of Search .......... 307/116; 340/825.05, 340/825.06, 825.16; 250/227.11, 227.21, 227.22; 370/85.15, 85.12, 85.5, 16.1; 371/11.2; 379/2, 102; 455/600, 601; 359/118-121, 110

[56] References Cited

U.S. PATENT DOCUMENTS

| | | | |
|---|---|---|---|
| 4,541,044 | 9/1985 | Shibata | 364/200 |
| 4,575,842 | 3/1986 | Katz et al. | 370/16 |
| 4,623,884 | 11/1986 | Ihara et al. | 340/825.05 |
| 4,709,365 | 11/1987 | Beale et al. | 371/11.2 |
| 4,815,803 | 3/1989 | Faulkner et al. | 350/96.14 |
| 4,932,745 | 6/1990 | Blonder | 350/96.16 |
| 4,956,836 | 9/1990 | Boatwright | 370/16.1 |
| 4,978,189 | 12/1990 | Blonder et al. | 350/96.12 |
| 5,007,697 | 4/1991 | Chadha | 350/96.15 |
| 5,016,957 | 5/1991 | Seaver | 350/96.14 |
| 5,020,152 | 3/1991 | Glista, Jr. | 370/1 |

Primary Examiner—A. D. Pellinen
Assistant Examiner—Richard T. Elms
Attorney, Agent, or Firm—Dike, Bronstein, Roberts & Cushman

[57] ABSTRACT

An optical bypass switch for a fiber optic local area communications network (LAN) with a ring topology allows an optical signal carried on the ring to by pass a node, which includes terminal equipment and a stub cable, associated with the switch. In a non-bypass mode, the optical signal is transmitted to and from the associated terminal. The switch assembly is remote from its associated terminal and includes optical couplers and associated optical receivers and activity detectors to produce electrical signals indicative of an optical input to and output from the terminal. Logic circuitry analyzes these signals and produces an appropriate drive signal for a switch controller. The remote switch has a local power supply and is preferably located at the junction of the ring and an associated, purely dielectric stub cable. The terminal can include a dual path transceiver and bridging equipment to provide cross links between terminals in the event of a link failure to complement the node failure protection of the bypass switch.

14 Claims, 3 Drawing Sheets

OPTICALLY CONTROLLED REMOTE BY-PASS SWITCH

This application is a continuation of application Ser. No. 07/543,465, filed Jun. 26, 1990, now abandoned.

BACKGROUND OF THE INVENTION

This invention relates generally to optical communication networks and in particular to a remote optical bypass switch for use in such a network.

Fiber optic local area networks (LAN's) using a ring topology require a bypass switch at each node where an optical signal carried on the ring is received and retransmitted. The bypass switch allows the transmission of information on the network if there is a failure in the regeneration of the signal at the associated node, whether this failure is due to a malfunction of equipment at the node, such as the failure of a transmitter LED, or a power failure. The optical signal is transmitted along the ring, through the bypass switch, without interfacing with the terminal or other equipment at the node. The node is therefore "bypassed" and optical energy carrying information continues to circulate through the network. In usual commercial fiber optic LAN's, bypass switches are integrated into each user terminal.

In military applications where buildings containing terminals may be prime targets for attack, it is desirable to place the bypass switch at a location remote from the terminals and preferably in a hardened environment. The remote location increases the survivability of the network. The present solution to providing a remote bypass capability has been to connect the terminal to the remote bypass switch with a hybrid stub cable, one containing optical cables to interface with the transmission system and copper cables that carry an electrical current sufficient to hold an optical relay in a non-bypassed mode. A control signal, usually developed at the terminal, is transmitted over the copper cables to the remote bypass switch. If power is lost, the relay operates to place the switch in a bypass mode. The relay can also operate, as by interrupting the holding current, if a failure is detected at the terminal equipment.

A drawback is that the copper cables leave the system susceptible to electromagnetic interference (EMI), whether man-made or natural, e.g. lightning. Another drawback in known fiber optic LAN's is that it is possible to lose an optical input at a defective node because the bypass switch is responsive only to a power failure or interruption. For example, a break in an optical fiber in the stub cable or a transmitter LED at the terminal which has a diminished output, but is still functioning to some degree can both result in the loss of information without triggering the operation of a conventional remote optical bypass switch.

It is therefore a principal object of the present invention to provide a remote optical bypass switch for a fiber optic LAN with a ring topology which detects and reliably operates in response to a power failure as well as a malfunction or destruction of an associated terminal.

Another object is to provide a remote bypass switch with the foregoing objects which can be automatically reset.

A further object is to provide a remote bypass switch which can operate in association with a purely dielectric stub cable and which therefore is significantly less susceptible to EMI than present commercial remote bypass switches.

Another object is to provide a remote bypass switch which can operate with all of the foregoing advantages during a power failure.

Still another object of the present invention is to provide a remote bypass switch with the foregoing advantages that can be manufactured using conventional components.

SUMMARY OF THE INVENTION

An optical bypass switch is connected in a local area fiber optic network at a location remote from an associated terminal. Multiple terminals communicate over the network via an optical ring. There are always periodic signals present on the ring, whether to establish transmission line faults or in the case of a dual counter rotating ring to provide a sufficient sensing signal to allow the network to wrap in the event of a break in the ring. Each terminal is associated with a node, typically with a stub cable connecting the terminal to the ring.

The stub cable has only optical cables; there are no electrical conductors carrying power from a terminal to the remote bypass switch. The switch is controlled by a signal detection system including a passive monitoring of signals to and from the terminal, conversion of the monitoring into an electrical signal indicative of signal activity, electrical logic circuitry to evaluate the monitored signals, and a switch control that can repeatably change the state of the optical switch between a non-bypass mode and a bypass mode. In the non-bypass mode, the stream of optical signals on the ring are directed to the terminal and the regenerated stream of signals are transmitted from the terminal to the ring. In the bypass mode, the stream of signals carried on the ring passes directly through the optical switch and does not get directed to the associated terminal.

Control of the switch is developed locally at the remote location. An optical coupler directs a small portion, e.g. 10%, of the input optical energy to an optical receiver and an activity detector. The receiver converts the optical energy to an electrical logic format and the activity detector is set to maintain a constant output if periodic logic level signals are present. Similarly, a like coupler, receiver and activity detector monitor the optical energy output of the transmitter in the associated terminal equipment. The outputs of the two activity detectors are logically combined. When there is input activity but no output activity, the logic level to a relay driver is removed causing the bypass switch to revert to the bypass mode, or with a different type of optical switch, the switch is pulsed to change its state. This latter implementation has lower power requirements. A local power supply remote from the terminal power the optical switch and its associated control circuitry. The local power supply is preferably a battery. In certain configurations, e.g. where the bypass switch is a ring stub cable junction and there is an external power supply associated with the ring, this external power supply can provide the power, and charge a battery as a back up power supply in the event the external power supply fails.

In a dual counterrotating ring implementation such as Ethernet or its next generation, the Fiber Data Distribution Interface (FDDI), survivability is further enhanced by placing the ring in a hardened trench, using a token passing protocol to facilitate wrapping in the event of a link failure, and a dual path transceiver and bridging equipment to provide cross links to mend link failures. Node failure is protected by the optical bypass switch of the present invention. The switch is preferably located at the stub/ring junction to minimize the optical path length after a bypass and thereby minimize optical power loss between the transceivers adjacent the bypassed transceiver.

These and other features and objects will be more fully understood from the following detailed description which should be read in light of the accompanying drawings.

DETAILED DESCRIPTION OF THE PREFERRED EMBODIMENTS

Figure 1:
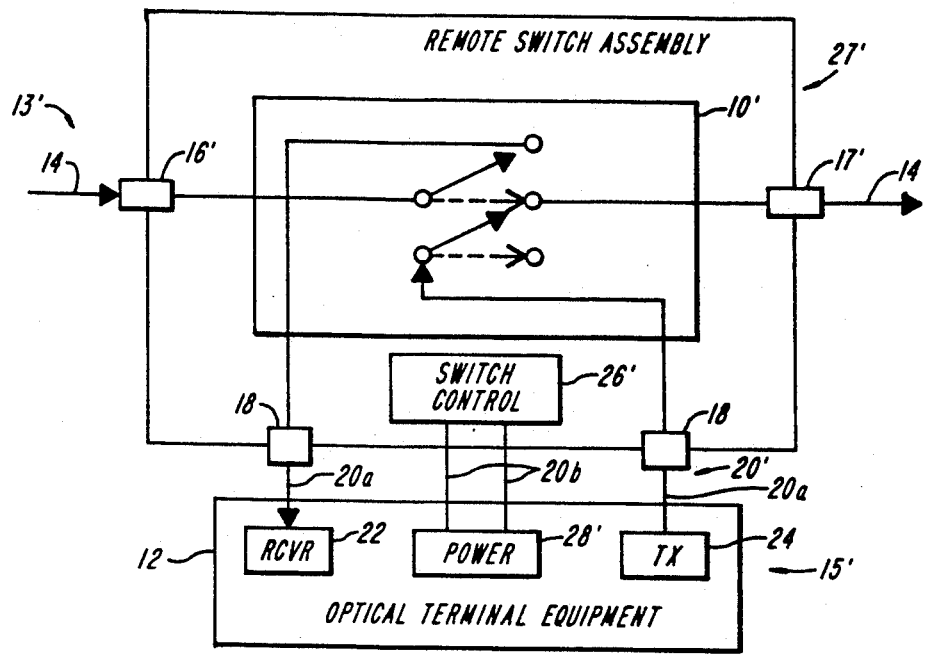
FIG. 1 is a schematic block diagram of a prior art optical remote bypass switch for use in a LAN with a ring topology.

FIG. 1 shows a conventional prior art arrangement for controlling a bypass switch 10' with an optical input 16' and an optical output 17'. The switch is remote from terminal equipment 12 defining one node 15' on a local area fiber optic network 13' (LAN). The LAN is the type using an optical ring 14 that carries a periodic stream of optical signals throughout the LAN. Signals on the ring from a transceiver "upstream" from a given node enter the optical switch 10 at the optical input 16' and exit the switch at the optical output 17' where they are carried by the ring to a "downstream" transceiver. The LAN typically include multiple nodes 15 optically coupled as indicated at 16',17' to ring 14 through the switch 10', optical connectors 18',18', and a stub cable 20'. The ring can be a single ring or a counter dual rotating ring. The terminal equipment is any of a wide variety of conventional equipment used in optical LAN's. This equipment usually includes a computer terminal and a modem with an optical receiver 22 and an optical transmitter 24 (forming a tranceiver). The optical switch is held in a non bypass position (shown in solid line in FIGS. 1-3) by a switch control mechanism 26', typically a conventional magnetic reed relay. The optical switch 10', switch control 26' and the associated optical and electrical connectors to the ring and terminal equipment form a switch assembly 27'. While a holding current is applied to the relay 26', the optical switch remains in the non bypass mode. If the power fails or is interrupted, the relay relaxes and allows the switch to assume a bypass position (shown in dashed lines in FIGS. 1-3) where the input optical signal from the ring 14 to the switch at 16' is directed through the switch to the output 17' without being transmitted to the terminal equipment where ordinarily the signal is regenerated. The terminal equipment is therefore bypassed.

The remote optical switch 10' is controlled by the switch control 26' which in turn is controlled by power provided by an electrical power supply 28' at the terminal equipment. The stub cable 20' is a hybrid cable having optical cables 20a and electrical conductors 20b such as twisted copper wires. The conductors 20b,20b conduct electrical power from the power supply 28' to the remote bypass switch assembly 27'. In addition to being susceptible to a power failure and EMI, this arrangement has cost and connection disadvantages of a hybrid cable and it will not detect and cause the switch 10' to respond to several conditions where the node should be bypassed, e.g., a break, in the optical cables 20a,20a or a failure or diminution in output power of the terminal transmitter 24.

Figure 2:
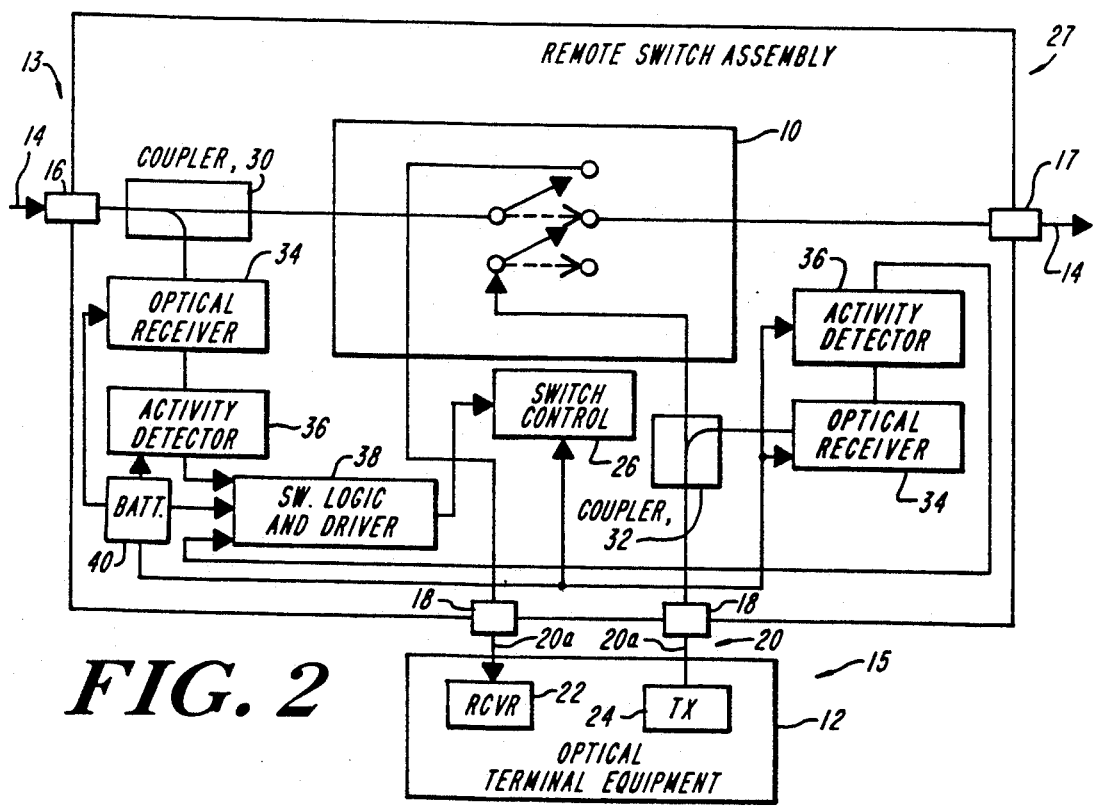
FIG. 2 is a schematic block diagram corresponding generally to FIG. 1 but showing an optically controlled remote bypass switch constructed according to the present invention.

FIG. 2 illustrates an optically controlled remote bypass switch 10 according to the present invention (like parts in FIG. 2 having the same reference number as in FIG. 1, but without a prime). The switch is connected at 16,17 into a ring 14 of a LAN and to a remote terminal 12, but the switch 10 is fundamentally different in that control of the switch is developed locally at the switch location remote from the terminal 12 and the switch is powered locally and therefore is not dependent on a remote power source (e.g. the terminal) or a hybrid stub cable 20' to convey the power. It therefore is also not responsive exclusively to a power failure or interruption.

In the FIG. 2 embodiment control of the optical switch 10 is derived locally from a passive monitoring of the optical energy input to the switch and the output to the switch from the transmitter 24 of the terminal 12. Optical couplers 30,32 produce this monitoring in combination with associated optical receivers 34,34 and activity detectors 36,36. Coupler 30 directs most of the optical energy to the switch 10, but diverts a portion, e.g. 10%, via an output 30a to the associated optical receiver, e.g. a photodetector, where the sampled optical signal is converted to an electrical format. The output signal of the photodetector 34 is applied to the activity detector 36 which is set to maintain a constant output if periodic logic level signals are present. Similarly, the output signal of the transmitter 24 is monitored by the coupler 32, the associated optical receiver 34 which converts the sampled optical output from the coupler output 32a into electrical logic level signals that are applied to an activity detector 36. The outputs of the two activity detectors 36,36 are combined logically by switch logic circuitry 38 and a switch driver for the relay 26. When there is input activity to the switch, as monitored by elements 30, 34, 36, but no output activity as monitored by the elements 32, 34, 36, the logic level signal to the relay driver is removed and the switch control 26 allows the switch to fall into the bypass mode.

In addition to providing local switch control, in the present invention a battery 40 or an equivalent powers the components 34, 36 and 38. The remote bypass switch of the present invention is therefore not only an "intelligent" switch, but also one which is self powered. As a result, the stub cable 20 in the present invention contains only fiber optic cables 20a,20a. There are no electrical conductors; the stub cable is purely dielectric and substantially impervious to EMI, including massive electromagnetic pulses produced in a nuclear explosion as well as naturally occurring pulses produced by lightning.

In the past the switch 10 has been one which reverts to the bypass condition under fail conditions. However in the control system of the present invention, control is provided by signals, not merely by the presence or absence of electrical power. As a result, it is possible to use a type of optical switch 10 that is bistable and is pulsed to change its state. This type of switch requires no holding current and consumes significantly less power than the conventional switch which requires a holding current. A suitable bistable latching switch is sold by Dicon Fiber Optics, Inc. under Model No. S22B-L.

Figure 3:
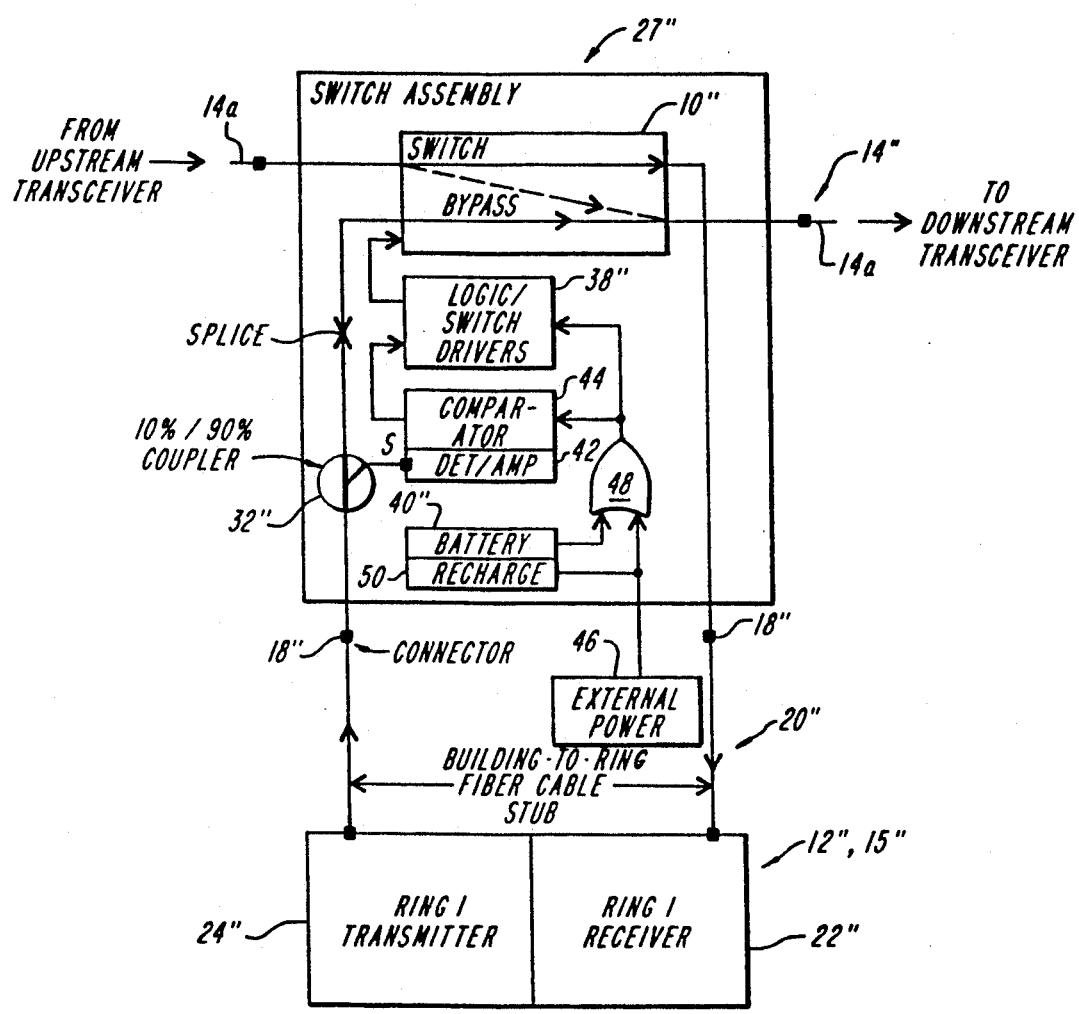
FIG. 3 is a schematic block diagram corresponding generally to FIGS. 1 and 2 showing a alternative switch assembly construction using a single coupler and a pulsed optical switch.

FIG. 3 shows an alternative embodiment of the remote optical bypass switch assembly 27" according to the present invention in block form. Like components in FIGS. 2 and 3 are identified with a double prime on the FIG. 3 components. For a dual counterrotating ring implementation, FIG. 3 shows one channel of the switch assembly 27". A complete switch is two identical such channels each servicing one fiber 14a of the ring 14".

As in the FIG. 2 embodiment, a purely dielectric stub cable 20" optically connects a transmitter 24" and receiver 22" at a node 15" to the ring 14" via a remote optical bypass switch 10", preferably a latching switch which does not require a holding current. There is no passive monitoring of the optical input signal from an upstream transceiver at an adjacent node in the LAN. There is a coupler 32" that taps off a small portion of the optical energy, e.g. 10%, and directs it to a photodetector 42 such as a PIN photodiode with a low pass preamplifier which detects the average optical power incident on the photodetector from the coupler 32". The amplified output of the photodetector 42 is applied to a comparator 44 where it is compared to a threshold value to produce a logic high or logic low output digital signal to the logic and switch driver 38" which places the switch 10" in either the bypass mode or non-bypass mode.

Figure 4:
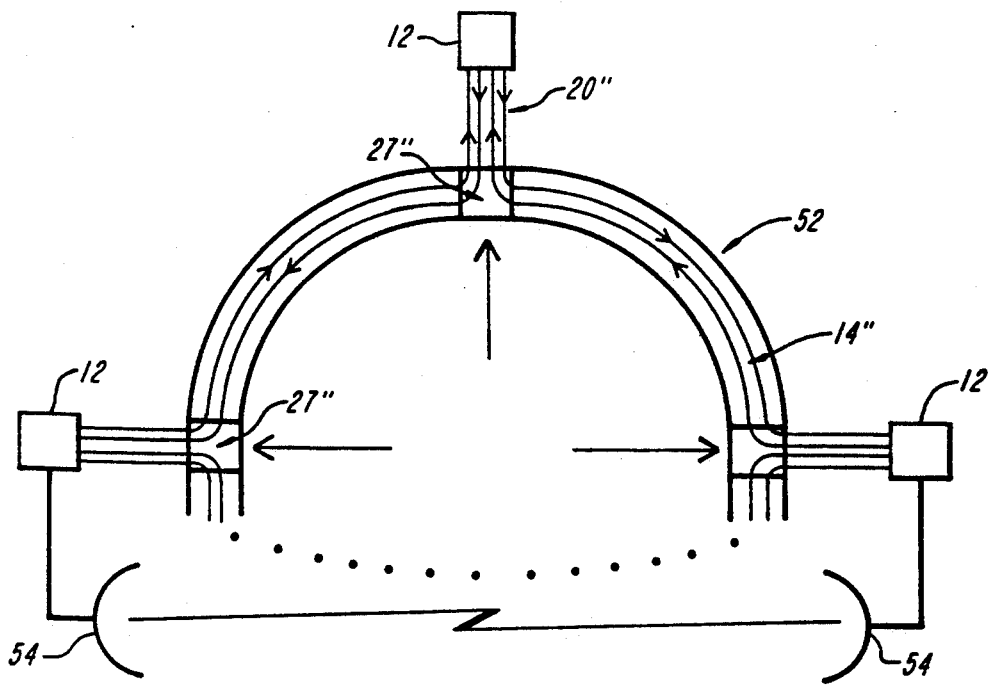
FIG. 4 is a simplified plan view of a LAN using a dual counterrotating optical ring, remote optically controlled bypass switches at each node and dual path transceivers.

While this switch assembly 27" can be operated with a local power supply only, e.g. a battery 40" forming part of the switch assembly, in certain applications the remote location of the switch will have a power source 46 external to the switch assembly 27" which can provide power to the switch assembly 27" without using a hybrid stub cable with electrical conductors to supply power from the terminal. If the ring 14" is located in a hardened trench as shown in FIG. 4, the trench can carry an external power supply as well as the fibers 14a with the switch assembly accessible through a manhole or the like. The external power is introduced to the switch assembly and its related circuits through a circuit gate 48 that also recharges the battery 40" through a recharger 50. This arrangement, when it can be implemented, enhances the survivability of the switch and reduces the likelihood of malfunction due to a power failure, either of an external power source or of a discharged battery.

Figure 5:
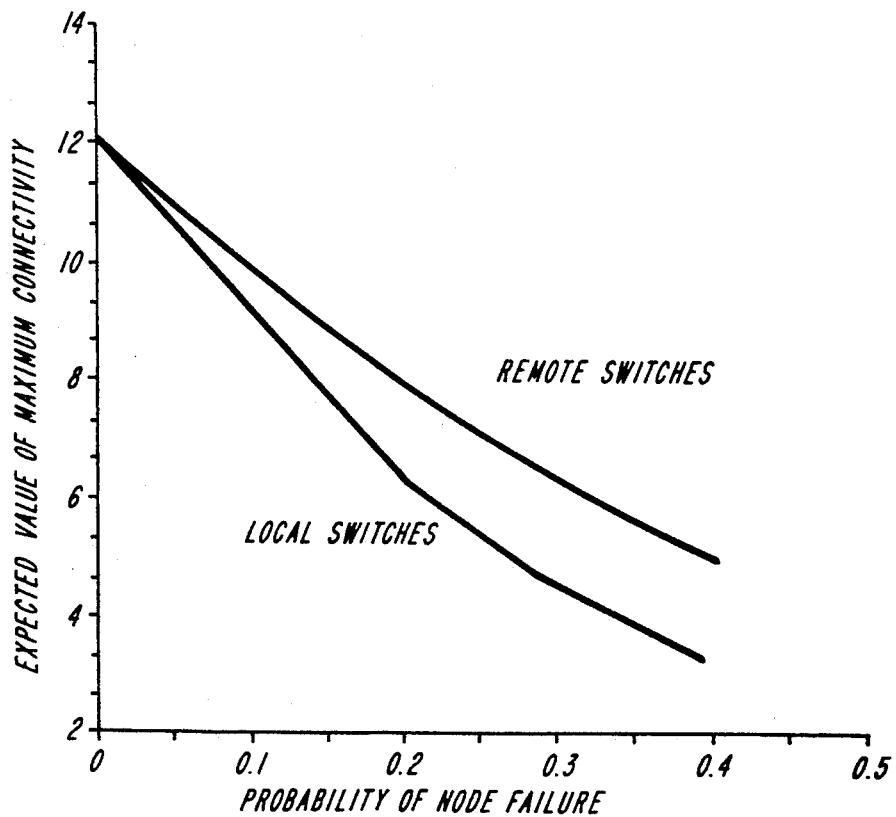
FIG. 5 is a graph of the expected maximum connections in a twelve node LAN as a function of node failure probability for remote and local switch locations.

In either the FIG. 2 or FIG. 3 embodiments the remote optical bypass switch assembly 27 or 27" has a local power source also remote from the terminal to increase the survivability of the network even if the node malfunctions or is destroyed. Typical stub cable lengths are 100 to 150 meters, but the precise length can vary greatly depending on the facility or vehicle which the LAN serves. The affect of thus "remoting" the optical bypass switch on the survivability of the network is shown in FIG. 5. The expected maximum connectivity for a twelve node survivable network is graphed as a function of values for the probability that any given node will fail. The expected connectivity is always better when the switch is remote from the terminal, as opposed to being located locally at the terminal.

The FIG. 3 embodiment has only one coupler on the transmit fiber(s) from the terminals. This implementation relies on the substantially continuous presence of optical signals on the network. The transceivers at each terminal or node is continually transmitting Manchester-coded data or an idle tone. Therefore failure of the transmit signal is critical to shutting down the node by actuating the bypass switch. The transmit signal can be lost if there is a power failure at the terminal, the LED of the transmitter fails or the building to ring stub cable is destroyed or malfunctions. In any of these events the remote bypass switch of the present invention detects the problem and has its own local power supply for this detection and to place the switch in the bypass mode until repairs or replacement can be made.

FIG. 4 illustrates a network topology particularly designed for enhancing the survivability of vital communication network for a fixed ground installation such as an airbase. A main cable plant 52 is physically hardened and installed in a hardened cable trench system to prevent a physical segmentation of the cable plant. The network is preferably a fiber optic counterrotating ring 14" implementation of the IEEE 802.3 (Ethernet) protocol. The ring architecture has inherent survivability advantages since there is no single point of failure which can crash the entire network and it is topologically compatible with a hardened backbone distribution system. Such a ring is also compatible with growth to next generation FDDI. Also, this LAN allows the use of conventional atmospheric microwave or optical transmission equipment to bridge links and provide redundant connectivity in the event of a link failure.

At each node a remote optical bypass switch 27" according to the present invention allows the network to automatically bypass a defective or non functioning transceiver to maintain the network. The bypass switch therefore automatically reconfigures the network to accommodate a problem at an associated node. Each terminal 12 in the FIG. 4 implementation is a dual path transceiver. This allows the network to recover from a single line failure by going into a self mending "wrap" mode. To guard against a second link failure which would segment the network, cross links 54 are actuated to automatically interconnect the fragmented segments. While a microwave cross link is illustrated schematically in FIG. 4, the cross links do not need to be microwave.

There has been described a remote optical bypass switch that is intelligent and self powered so that it can bypass a node not only when there is a power failure, but also when there are other malfunctions which can cause the loss of communications on the network such as a non functioning or poorly functioning transmitter LED, a break in a stub cable, or a malfunction or destruction of the transceiver. The switch of the present invention not only enhances the survivability of the network, it also reduces its susceptibility to EMI. It provides these advantages using only standard "off-the-shelf" components. In particular, it does not require special hybrid stub cables and the problems associated with connecting such cables into a network. The system also operates with reduced power consumption to maintain the maximum connectivity even in the event that external power is lost for an extended period of time.

While the invention has been described with respect to its preferred embodiments, it will be understood that various modifications and alterations will occur to those skilled in the art from the foregoing detailed description and the accompanying drawings. For example, while the invention has been described with respect to a fixed, ground based LAN, it can also be used in mobile LAN's. These and other variations and modifications are intended to fall within the scope of the appended claims.

What is claimed is:

1. A bypass switch that increases the survivability and performance of a local area optical communications network having a ring carrying periodic optical signals, a plurality of nodes optically coupled into the ring through the bypass switch, each node connecting the ring via the bypass switch and a stub cable to a terminal having an optical receiver and an optical transmitter that regenerates the received signals, the stub cable alone optically connecting the ring and the terminals through the bypass switch, comprising
   means associated with each node for passively monitoring and detecting the average optical power output from the associated one of said terminals and generating a first control signal if there is a diminution of said optical power output as compared to a threshold value,
   logic means responsive to said first control signal that generates a second control signal,
   a plurality of optical switches each optically coupled to said ring and to the associated terminal through the associated stub cable, said switches each being bistable and latching between bypass and non-bypass states, and
   means for generating a signal to switch the state of said optical switch in response to said second control signal,
   said passive monitoring means, logic means, optical switch and switch signal generating means being located remotely from the associated terminal at a node of the ring, and said stub cable being purely dielectric.

2. The bypass switch of claim 1 wherein said switch includes a local power supply for said logic means, said second control signal generating means and said optical switch.

3. The bypass switch of claim 1 wherein said switch is located at a junction of the stub cable and the ring.

4. The bypass switch of claims 1, 2 or 3 wherein said passive monitoring means includes a coupler and a photodetector operatively associated with one output of said coupler.

5. The bypass switch according to claim 4 wherein said passive monitoring means includes an activity detector that receives a detected optical energy signal from said photodetector.

6. The bypass switch according to claims 1, 2 or 3 wherein said second control signal places said optical switch in a bypass mode whenever there is a failure of the optical power output from the node and there is an optical power input to the node.

7. The bypass switch of claims 1, 2 or 3 wherein said passive monitoring means also includes means for monitoring the optical power input to the node and generating a first control signal indicative of whether there is a periodic optical input to the node from the ring.

8. An intelligent optical bypass switch that enhances the survivability and performance of a ringtype LAN where the switch is remote from an associated terminal and optically connected at a node to a ring that carries periodic optical communication signals among a plurality of said terminals and also optically connected by a stub cable alone to a receiver and a transmitter of said terminal, said remote optical bypass switch comprising,
   an optical switch set by a directional pulse into 1) a bypass mode where the optical signal carried on the ring bypasses the associated terminal or 2) a non-bypass mode where the optical signal carried on the ring is directed to and from said receiver and transmitter, respectively,
   a first coupler connected between said ring and said switch to divert a portion of the input optical signal carried on said ring,
   a second coupler connected between said transmitter and said switch to divert a portion of the output optical signal of said terminal to said ring,
   switch control means to drive said switch between said bypass and non-bypass modes,
   switch logic and driver means that produces an output signal that controls said switch control means, and
   first and second optical receivers and activity detectors connected to receive said diverted input and output optical signal portions, respectively, and to produce output signals to said switch logic and driver means indicative of whether there is optical activity input to the terminal from the ring and to the ring from the terminal and indicative of the average optical power of said optical output signal portion from the terminal,
   and said stub cable being purely dielectric.

9. The bypass switch of claim 8 wherein each terminal includes a dual path transceiver and bridging equipment and further comprising cross links between said nodes or terminals to increase the survivability of the network in the event of a failure at any point in the network.

10. The bypass switch of claim 8 wherein said bypass switch is located at the junction of the ring and the stub cable.

11. The bypass switch of claim 8 further comprising a local power source associated with said switch.

12. The bypass switch of claim 11 wherein further comprising an external power source which recharges said local power source and operates said switch.

13. The bypass switch of claim 8 wherein said stub cables are dielectric and transmit optical energy only.

14. The bypass switch of claim 8 wherein said ring has dual counterrotating optical cables and wherein each node has a stub cable and an associated terminal connected to each cable of the ring.

* * * * *